UNITED STATES PATENT OFFICE.

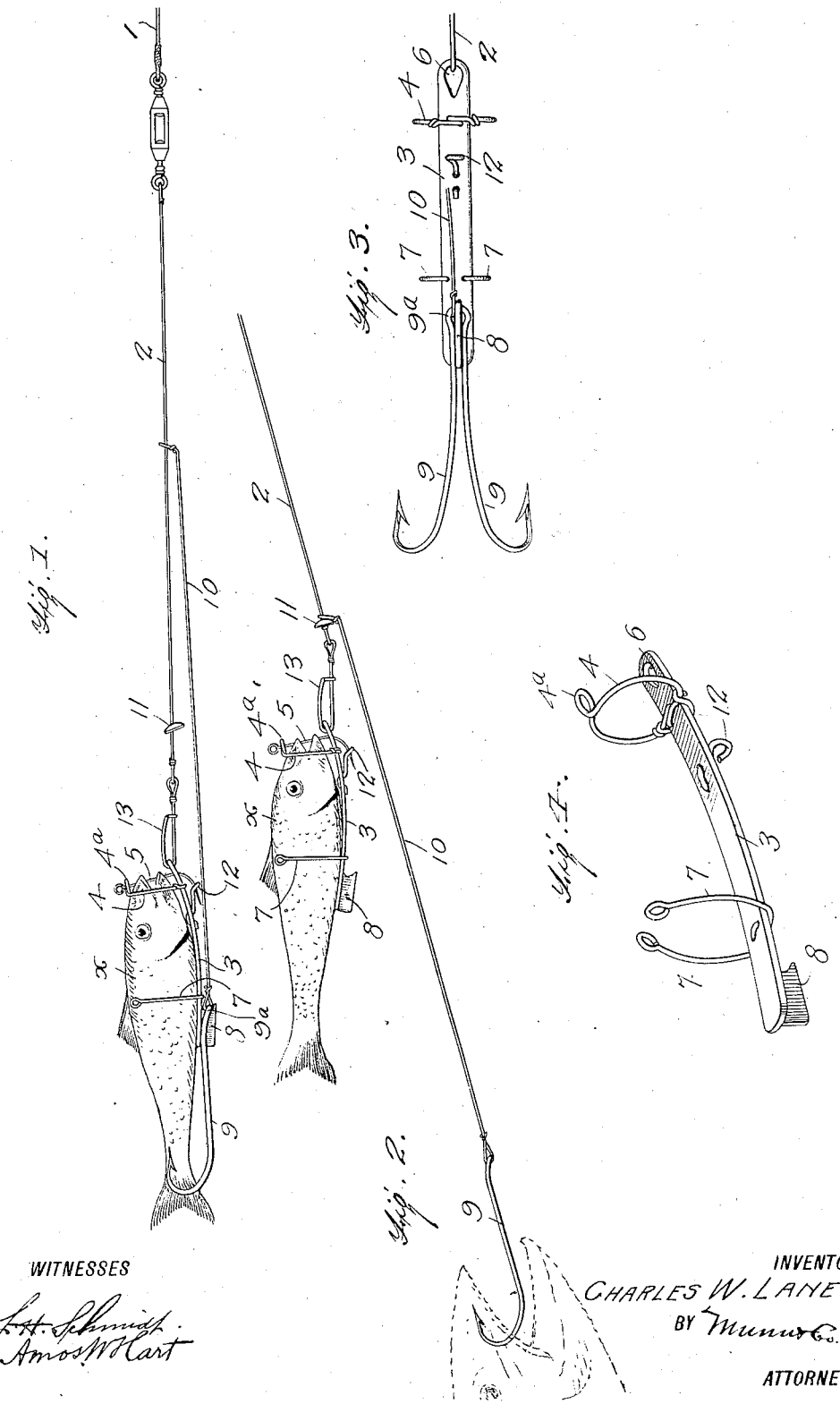

CHARLES W. LANE, OF MADRID, NEW YORK.

BAIT-HOLDER.

1,114,698.  Specification of Letters Patent.  Patented Oct. 20, 1914.

Application filed January 29, 1914. Serial No. 815,160.

*To all whom it may concern:*

Be it known that I, CHARLES W. LANE, a citizen of the United States, and a resident of Madrid, in the county of St. Lawrence and State of New York, have made an Improvement in Bait-Holders, of which the following is a specification.

My invention consists in the improved holder proper for live bait, especially minnows, and in an attachment of the same comprising barbed hooks which are released from the holder proper when a fish is impaled on them in the act of seizing a minnow.

The details of construction and operation are as hereinafter described, and illustrated in the accompanying drawing, in which—

Figure 1 is a side view of the invention as applied to a live minnow for securing the same. Fig. 2 is a side view illustrating the position of the hooks after a fish has been impaled. Fig. 3 is a bottom plan view of the invention. Fig. 4 is a perspective view of the main portion of the device constituting the minnow-holder proper.

Referring in the first instance to Fig. 1, the numeral 1 indicates a fishing line, and 2 a snood connecting it with the device which serves for holding a live minnow $x$. The said device comprises the following parts: a flat, narrow, and slightly curved bar 3, formed preferably of aluminum; a wire loop or ring 4 adapted to receive the nose of the minnow $x$; a pin 5 passing through an eye $4^a$ on the ring 4 and engaging a hook 12 on the under-side of bar 3, it being inserted intermediately through the lips or jaws of the minnow; wire spring arms 7 attached to the bar 3 near its rear end and serving to embrace the sides of the minnow, as shown in Figs. 1 and 2, and thus hold the body of the same in alinement with the bar; a catch 8 formed on and projecting downward from, the rear end of the bar 3, the same being in the nature of a lug having a notch at its front end; impaling hooks 9, which are slidably connected with snood 2 by means of supplemental snood or wire 10.

The attachment of the live minnow $x$ to the holder comprising the bar 3 and its attachments will be readily understood from Figs. 1 and 2, and the arrangement of the impaling hooks 9 is also illustrated in Figs. 1 and 3, where it will be seen that the shanks of the hooks are formed integrally and crimped so as to clasp the body of the lug 8 between them, the looped front end $9^a$ of the shanks engaging the notch in the front end of the catch 8. Thus the hooks project rearwardly, one being on each side of the tail of a minnow, or just in front of the same.

I desire to be understood that I do not necessarily restrict myself to the use of two hooks, since it is practicable to employ one only. The practical use of the invention may now be readily understood. The minnow having been attached to the holder as shown in Figs. 1 and 2, and the hooks 9 having been adjusted in the position shown in Figs. 1 and 3, the bait is ready for casting. Upon a fish, say a bass, attempting to seize the minnow, he is impaled on both the hooks 9, and, in a struggle, quickly disengages them from the catch 8, and is thus entirely separated from the minnow, as shown in Fig. 2, without damage to the minnow.

When in normal position the hook snood 10 will lie nearly parallel to the line snood 2, as shown in Fig. 1; but as soon as the hooks are released from the catch 8 of the minnow-holder, as shown in Fig. 2, the snood 10 is pulled back on the snood 2 until arrested by the washer 11.

Between the washer 11 and the bar 3 of the minnow-holder a closed hook 13 is preferably inserted for connecting the snood 2, with the holder.

It is obvious that, by my invention, a live minnow may be used as bait much longer than when secured to a fishing-line in the ordinary way, since it is little liable to injury upon a larger fish attempting to seize it.

I claim:—

1. A holder for live bait comprising a bar having near its front end a loop for receiving the nose of the minnow, a pin adapted for insertion through the lips of the minnow, the same being attached to both loop and bar, and the bar having at its rear end spring arms which curve inward to embrace and press upon the body of the minnow, as described.

2. The combination with a holder for a live minnow, of an improved hook attachment, the same being detachably connected with said holder, and a snood for the hook which connects the latter with the line and is adapted to slide thereon when the hook is detached from the minnow-holder, as described.

3. The combination with a fishing line, a minnow holder having a bar provided with means for securing the body of a minnow, of a hook having a spring clasp embracing the rear pendent portion of said bar and adapted to be detached therefrom when traction is applied to the hook, and means connecting the hook with the line, and slidable thereon, as described.

4. The combination with a fishing line, a minnow-holder including a bar having its rear portion provided with a pendent catch, of an impaling hook attachment comprising two hooks arranged opposite each other and diverging laterally, the shanks of the same being permanently connected and crimped to cause them to embrace and clasp the said catch, the arrangement of the hooks being as described, whereby they extend rearward and project on both sides of the tail of a minnow, as described.

CHARLES W. LANE.

Witnesses:
ELLA M. YOUNG,
HERBERT E. CONSTINE.